United States Patent
Ochs

(10) Patent No.: US 9,809,035 B2
(45) Date of Patent: Nov. 7, 2017

(54) METHODS, SYSTEMS, AND DEVICES FOR INKJET COLOR MANAGEMENT

(71) Applicant: XEROX CORPORATION, Norwalk, CT (US)

(72) Inventor: Matthew J. Ochs, Webster, NY (US)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 15/048,898

(22) Filed: Feb. 19, 2016

(65) Prior Publication Data

US 2017/0239957 A1    Aug. 24, 2017

(51) Int. Cl.
*B41J 29/393* (2006.01)
*B41J 2/21* (2006.01)

(52) U.S. Cl.
CPC ........... *B41J 2/2132* (2013.01); *B41J 29/393* (2013.01)

(58) Field of Classification Search
CPC ...... B41J 13/0009; B41J 11/46; B41J 11/007; B41J 11/42; B41J 2/01; B41J 11/0005; B41J 11/003; B41J 11/0045; B41J 11/04; B41J 13/02; B41J 13/03; B41J 29/383; B41J 2/2132
See application file for complete search history.

(56) References Cited

U.S. PATENT DOCUMENTS 6,975,949 B2    12/2005  Mestha et al.
8,727,476 B2 *   5/2014  Pous ..................... B41J 29/393
                                                   347/19

OTHER PUBLICATIONS

Herloski, Robert P. et al. Spatially-Resolved FWA Spectrophotometer Using Micropatterned Optical Filters. U.S. Appl. No. 14/725,909, filed May 29, 2015; pp. 1-34.
Herloski, Robert P. et al. Dual-Use Full-Width Array and Methods for Usage Thereof. U.S. Appl. No. 14/698,216, filed Apr. 28, 2015, pp. 1-21.

* cited by examiner

*Primary Examiner* — Lamson Nguyen
(74) *Attorney, Agent, or Firm* — MH2 Technology Law Group LLP

(57) ABSTRACT

A system, device, and method for managing colors of a color printer by printing color patches on a test sheet of paper associated with a paper type, determining spectral data of the color patches using an inline full width array spectrophotometer of the color printer, determining measurements based on the spectral data, determining that a measurement is equal to or within a range of a measurement associated with an existing paper profile; and printing subsequent sheets of paper associated with the paper type using parameters associated with the existing paper profile.

18 Claims, 6 Drawing Sheets

METHODS, SYSTEMS, AND DEVICES FOR INKJET COLOR MANAGEMENT

BACKGROUND

There are numerous different types of printer paper available for printing documents. Additionally, the type of paper can have a large effect on the resulting documents. For example, particularly when using water-based inkjet printers, certain paper types can cause colors to be brighter, can increase or decrease the color gamut volumes (subset of colors available), and/or can affect the contrast between colors and/or between the colors and the paper (e.g., the contrast between black text and the whiteness of the paper).

Accordingly, parameters of an inkjet printer that result in suitable printed color documents with one type of printer paper may not be suitable for other types of printer paper.

Therefore, inkjet printer technology can be improved by methods, systems, and devices for efficiently managing parameters, such as color management controls, of an inkjet printer.

SUMMARY

The present disclosure relates to systems, devices, and methods for managing colors of a color printer by printing color patches on a test sheet of paper associated with a paper type, determining spectral data of the color patches using a full width array spectrophotometer, determining measurements based on the spectral data, determining that a measurement is equal to or within a range of a measurement associated with an existing paper profile; and printing subsequent sheets of paper associated with the paper type using parameters associated with the existing paper profile.

In some embodiments, printing the color patches can be based on receiving an instruction to profile the test sheet of paper.

In further embodiments, the color printer can be an inkjet printer, such as an aqueous inkjet printer.

In some embodiments, the full width array spectrophotometer can be an inline spectrophotometer of an inkjet printer.

In other embodiments, the full width array spectrophotometer can scan both sides of the test sheet of paper.

In various embodiments, the spectral data can include spectral data corresponding to the whiteness of the test sheet of paper.

In some embodiments, the measurement can include, for example, color brightness, color gamut volumes, color contrast, ink showthrough, or paper whiteness.

In some implementations, the color printer can print color patches on a second test sheet of paper associated with a second paper type, determine spectral data of the color patches of the second test sheet using the full width array spectrophotometer, and adjust parameters of the color printer based on determining that a measurement is not equal to or within a range of measurements associated with existing paper profiles.

In further implementations, the adjusted parameters can include, for example, total area coverage, ink limits, gray component replacement, or color contrast.

In some embodiments, the color printer can repeatedly perform a second method until new measurements associated with a new test sheet of paper are equal to or within a range of target measurements, the second method can include: adjusting parameters of the color printer based on measurements associated with a previous test sheet of paper; printing color patches on a new test sheet of paper associated with the second paper type based on the adjusted parameters of the color printer; determining new spectral data of the color patches of the new test sheet of paper using the full width array spectrophotometer; and determining new measurements based on the new spectral data. Based on adjusted parameters that resulted in the new measurements within the target range, a new paper profile can be generated.

In further embodiments, the parameters can be iteratively adjusted.

BRIEF DESCRIPTION OF THE DRAWINGS

The accompanying drawings, which are incorporated in and constitute a part of this specification, illustrate various embodiments of the present disclosure and together, with the description, serve to explain the principles of the present disclosure. In the drawings.

DETAILED DESCRIPTION

Figure 1:
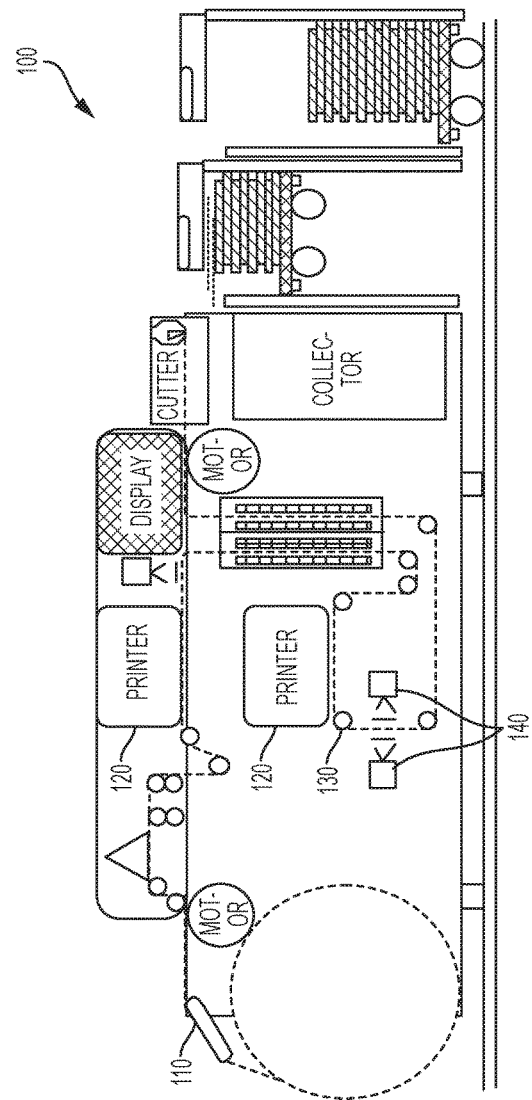
FIG. 1 is a diagram depicting an example inkjet printer system schematic, consistent with certain disclosed embodiments.

The following detailed description refers to the accompanying drawings. Wherever possible, the same reference numbers are used in the drawings and the following description refers to the same or similar parts. While several exemplary embodiments and features of the present disclosure are described herein, modifications, adaptations, and other implementations are possible, without departing from the spirit and scope of the present disclosure. Accordingly, the following detailed description does not limit the present disclosure. Instead, the proper scope of the disclosure is defined by the appended claims.

Generally, inkjet printer systems can be configured using parameters, such as color management controls. Examples of color management controls can include, but are not limited to, total area coverage, ink limits, gray component replacement, color contrast, etc.

Because the type of paper used in an inkjet printer system can greatly affect the output of the system, such as printed color documents, the parameters used to achieve satisfactory results of one type of paper may be unsuitable for a different type of paper. Thus, the selection of printer parameters is an important step when printing with an inkjet printer system.

In some embodiments, parameters, including color management controls, can be stored on an inkjet printer system as paper profiles or International Color Consortium (ICC) profiles. For example, an inkjet printer system can be purchased preloaded with three paper profiles for three common types of printer paper (e.g., untreated/uncoated, treated/uncoated, and treated/coated). Additionally, in some implementations, additional paper profiles can be added to the inkjet printer system after purchase.

In various embodiments, a paper profile can be designed to balance various printing factors, such as cost to print, quality of the printed output, water content in the printed output, amount of drying needed, etc.

A paper profile can be selected (automatically or manually) when at least one sheet of paper of a type that corresponds to a paper profile is used by the system. Based on the paper profile, the inkjet printer system can automatically set the parameters in accordance with the paper profile. However, there are many types of printer paper, and an inkjet printer system may be fed a type of printer paper that is unknown and/or unidentified.

When an unknown type of printer paper is fed into an inkjet printer system (i.e., a type of printer paper not known to be associated with an existing paper profile), the system can print one or more test sheets with color patches using sheets of the unknown type of printer paper. The test sheets can be printed using inkjet printheads that use, for example, aqueous (water-based) ink.

Aqueous ink differs from, for example, xerographic ink in that the total area coverage parameter is important not just for durability of the ink pile height, but also to avoid putting down excessive water content that results in ink showthrough. Ink showthrough is not only visually objectionable, but also can result in other issues, such as sheet wrinkle, curl, cockle, etc.

In some embodiments, the inkjet printer system can include an inline Full Width Array (FWA) spectrophotometer, such as an FWA as described in U.S. Pat. No. 6,975,949, which is incorporated by reference in its entirety, and the system can send the printed test sheet to be scanned by the FWA. The FWA can determine spectral data based on the printed test sheet, which can be used to determine measurements, such as color brightness, color gamut volumes, color contrast, ink showthrough, paper whiteness, etc., to determine whether the measurements are acceptable, and/or to determine a new or existing paper profile to associate with the unknown type of printer paper. Once the type of printer paper is associated with a paper profile, the paper profile can be used (based on an automatic or manual selection) when printer paper of that type is fed into the system.

FIG. 1 is a diagram depicting an example inkjet printer system schematic, consistent with certain disclosed embodiments. FIG. 1 is intended merely for the purpose of illustration and is not intended to be limiting.

As depicted in FIG. 1, inkjet printer system 100 can include, for example, paper feed mechanism 110, inkjet printheads 120, and FWA 140. A sheet of paper can be feed into feed mechanism 110, and follow path 130 to inline inkjet printheads 120, then to inline FWA 140, and then can be output from the system. Accordingly, in some implementations, inkjet printer system 100 can be a closed system with at least the above-described components. Inkjet printer system 100 can, in further implementations, include other components, such as, for example, one or more motors, one or more cutting mechanisms, one or more stapling mechanisms, user input devices, display devices, etc.

In some embodiments, an unknown type of paper can be placed into paper feed mechanism 110. Inkjet printer system 100 can then receive an instruction to profile the paper type. For example, an operator can provide an indication that a new or unknown type of paper has been placed into paper feed mechanism 110 (e.g., using a button or other type of input mechanism). Alternatively, for example, the instruction can be based on a determination by inkjet printer system 100 that new paper has been added to a paper loading mechanism of the system, and/or based on a determination that a sheet in paper feed mechanism 110 has not been profiled.

Figure 4:
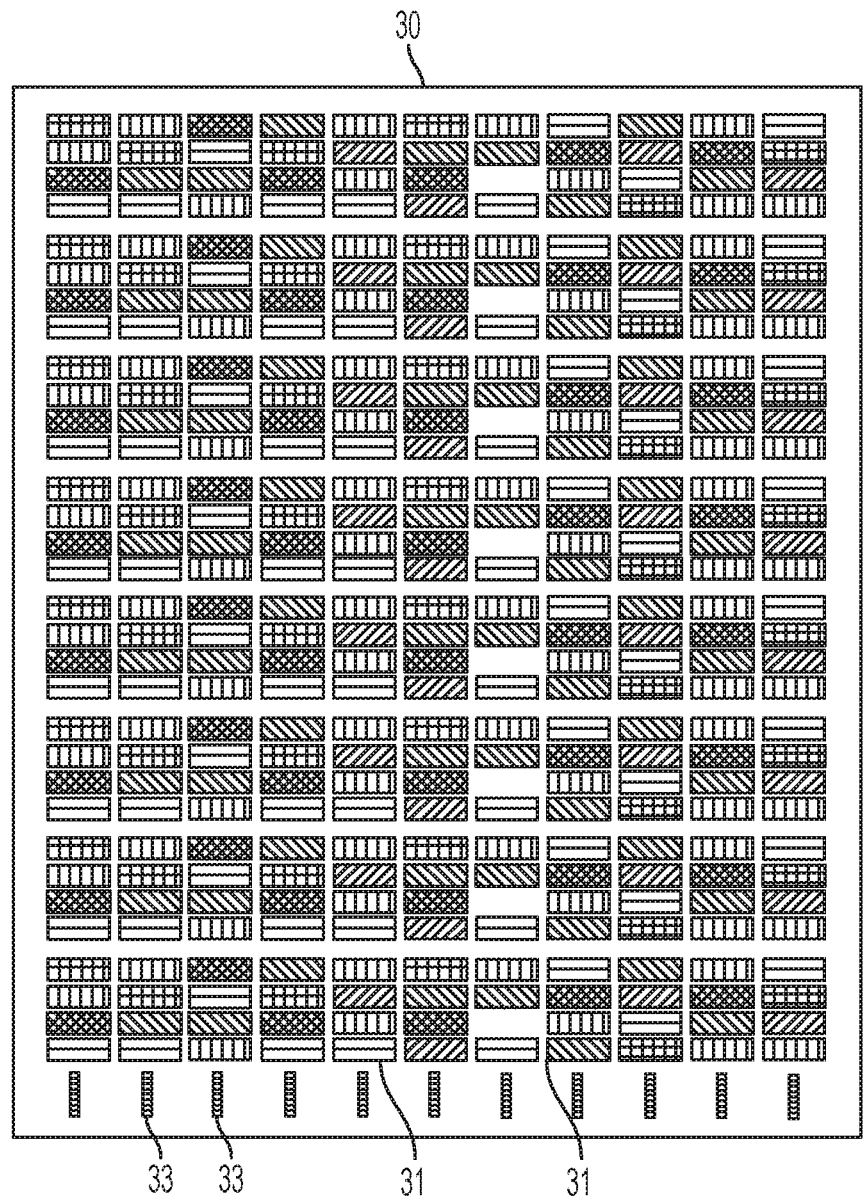
FIG. 4 is an example of a printed test sheet with multiple different colors of color patches, consistent with certain disclosed embodiments.

In some implementations, inkjet printer system 100 can, in response to the instruction, begin printing one or more test sheets with color patches using inkjet printheads 120. Example color patches are shown in FIG. 4 and described in further detail below.

In some embodiments, inkjet printheads 120 can use aqueous (water-based) ink.

In various embodiments, inkjet printheads 120 can be used to print test sheets by propelling droplets of ink onto the paper based on parameters (e.g., color management controls) of one or more paper profiles. A paper profile can define various parameters for use when printing a document.

In some embodiments, when an instruction is received to profile a paper type, the inkjet printer system 100 can print test sheets using, for example, a testing profile (i.e., a paper profile designed for printing test sheets), another type of pre-existing paper profile, or manually entered parameters.

Inkjet printheads 120 can be, for example, thermal inkjet heads that use the thermal inkjet process to move drops of ink by using a pulse of current passed through a heating element that causes a rapid vaporization of the ink in the chamber and forms a vapor bubble, which causes a large pressure increase, propelling a droplet of ink onto the paper. Surface tension of the ink, the condensation, and a contraction of the vapor bubble pull a further charge of ink into the chamber through a narrow channel attached to an ink reservoir.

As an additional example, inkjet printheads 120 can be Piezoelectric inkjet heads that, instead of a heating element, use a piezoelectric material in an ink-filled chamber behind the nozzles. When a voltage is applied, the piezoelectric material can change shape, which generates a pressure pulse in the fluid and can force a droplet of ink from a nozzle.

In some embodiments, inkjet printheads 120 can apply between zero and eight droplets of ink per dot, depending on an intended color of the dot and the parameters.

Once a test sheet is printed, it can be scanned by FWA 140. FWA 140 can measure spectral data (as described in further detail in U.S. Pat. No. 6,975,949) to determine, for example, color brightness, color gamut volumes, color contrast, paper whiteness, etc. Additionally, in some embodiments, FWA 140 can measure both sides of the paper to also determine a showthrough level of the ink (e.g., how much ink bleeds through the paper, if any) based on the spectral data. For example, as depicted in FIG. 1, FWA 140 can include sensors on both sides of the printed sheets as the sheets travel down path 130.

In some implementations, once the spectral data is measured, the measured data can be compared to expected data associated with one or more existing paper profiles. For example, if a testing profile is used, one or more existing paper profiles can be associated with expected data for paper types associated with the paper profile. In other words, a paper type associated with a first paper profile may be expected to produce certain spectral data when a test page is printed on the paper type using the testing profile.

In some embodiments, inkjet printer system 100 can be a closed loop system. For example, inkjet printer system 100 can print a test sheet, using inkjet printheads 120, scan the test sheet, using FWA 140, and then use the data from the scanned test sheet as feedback to adjust parameters and print a subsequent test sheet and/or regular print jobs, as described in further detail below.

Accordingly, if the measured data is similar to expected data of a paper profile then the paper profile can be associated with the new or unknown type of paper, as described in further detail below. Regular print jobs using the new or previously unknown type of paper can be printed using the identified paper profile.

If the measured data is not similar to expected data, then a new paper profile can be created by printing subsequent test sheets, as described in further detail below.

Figure 2:
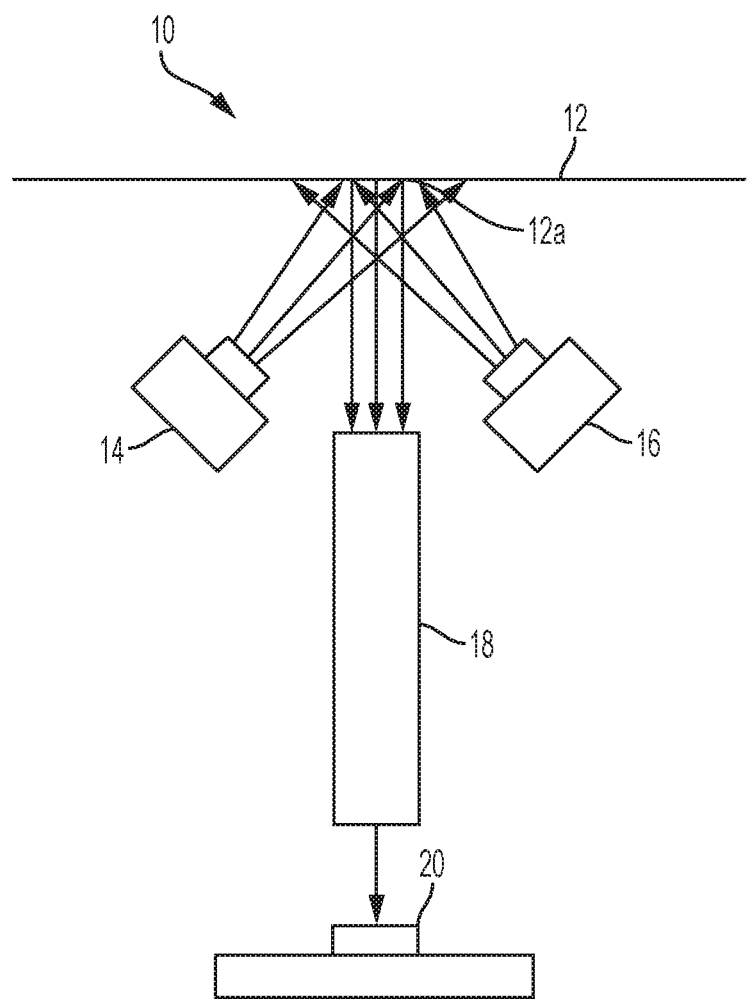
FIG. 2 is a diagram depicting a schematic side view of one example of an FWA spectrophotometer shown scanning a printed sheet in the output path of an inkjet printer system, consistent with certain disclosed embodiments.

FIG. 2 is a diagram depicting a schematic side view of one example of an FWA spectrophotometer shown scanning a printed sheet in the output path of an inkjet printer system, consistent with certain disclosed embodiments.

As depicted in FIG. 2, FWA spectrophotometer system 10 includes both LED arrays 14, 16 of an illumination system (which may be mounted on a single printed circuit board) oppositely oriented at about 45 degrees to a printed test sheet 12 they are both illuminating. Thus they allow perpendicular orientation, in between LED arrays 14 and 16, of a linear reflected light optical path from 12A to the imager array 20 through SELFOC lens 18.

Further details regarding measuring spectral data using an FWA spectrophotometer system can be found in U.S. Pat. No. 6,975,949, which is incorporated by reference.

Figure 3:
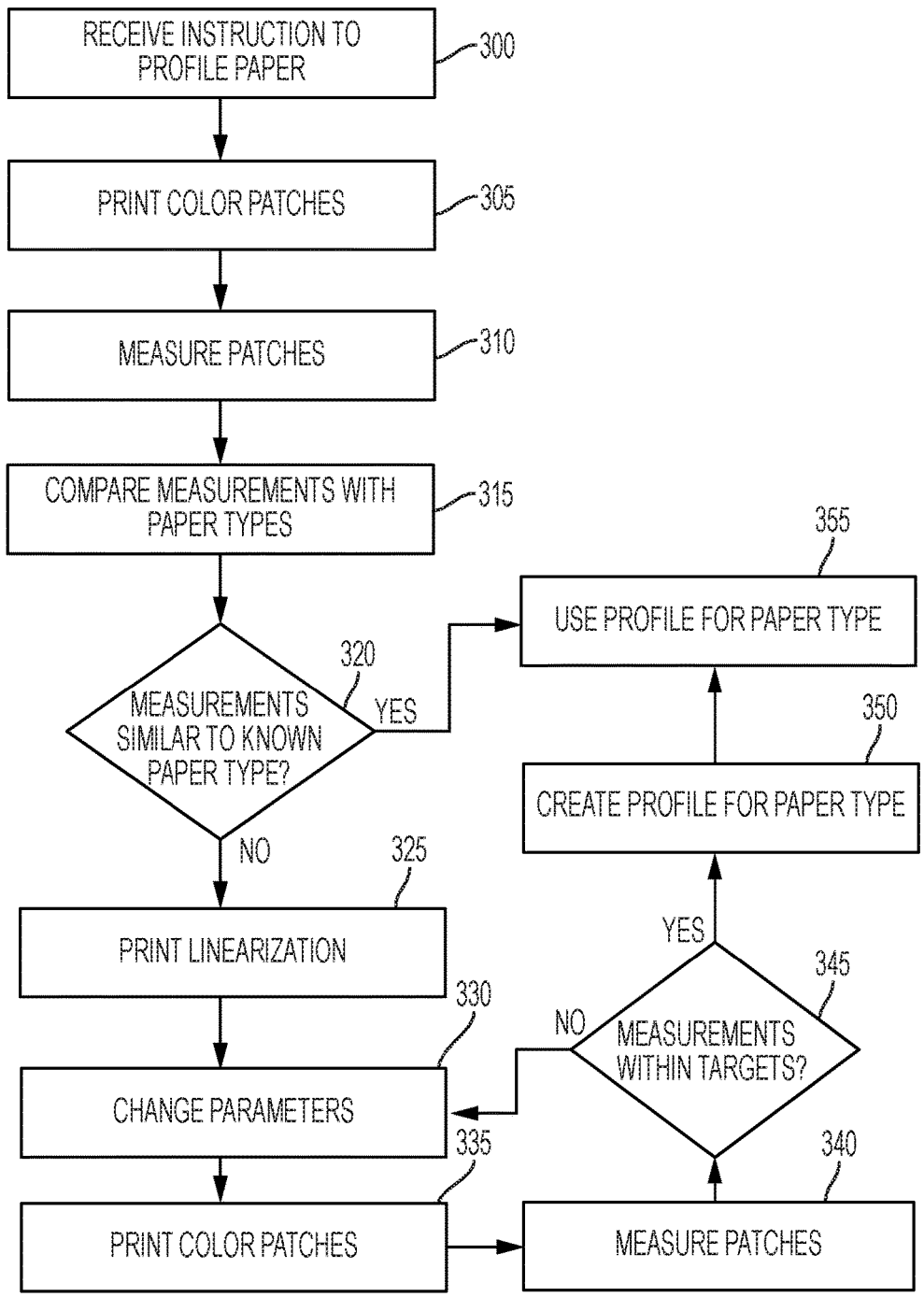
FIG. 3 is a flow diagram illustrating an example method of managing paper profiles in an inkjet printer system, consistent with certain disclosed embodiments.

FIG. 3 is a flow diagram illustrating an example method of managing paper profiles in an inkjet printer system, consistent with certain disclosed embodiments. The process can begin in 300 when the system receives an instruction to profile the paper type. In some embodiments, the instruction can be based on an input by an operator using, for example, a button on the system, an input terminal that is part of and/or connected to the system, or a computing device connected to the system via a direct or network connection. For example, the operator may be adding a new type of paper into a paper feed. As a further example, the operator may not be aware that a paper profile exists for the type of paper being added. As another example, the operator may have determined that there are possible errors in a previous printout using the type of paper and a previous paper profile (e.g., due to color drifts that may be caused by varying area coverage input interactions with the paper substrate and drying systems of the inkjet printer system).

In further embodiments, the instruction can be generated by the system, when the system scans a printed document using an FWA spectrophotometer and determines, for example, that a color level is incorrect, that the whiteness of the paper does not match an expected whiteness associated with a current paper profile, that there is more than a threshold amount of showthrough of the ink, that color contrasts and/or color/paper contrasts are incorrect, etc. In some embodiments, the instruction can be generated by the system when any new paper is loaded into a paper feed and/or used by the system. In further embodiments, the instruction can be generated by the system when color drifts cause errors in previous printouts, which are detected by the system.

In 305, the system can print a test sheet with color patches. The color patches can be CMYK and/or RGB patches. CMYK and RGB patches can allow for patches with limited colors, but that provide a simulation of what kind of colors can be achieved using the test sheet and current parameters.

In some embodiments, the test sheet can be printed using a testing paper profile, a current paper profile (i.e., a paper profile currently active on the system), or a selected paper profile (e.g., by an operator). An example test sheet is shown in FIG. 4 and described in further detail below and in U.S. Pat. No. 6,975,949.

In 310, the system can measure the patches using the FWA spectrophotometer, as described in further detail below with regard to FIG. 5, to determine spectral data. The spectral data can then be used to determine various measurements, such as color, density, showthrough, and contrast, etc.

In 315, the system can compare the measurements to expected measurements from other paper types associated with existing paper profiles. For example, as paper quality and cost increase, so does the size of the achievable gamut volume. In other words, cheaper paper can result in smaller gamut volumes. Accordingly, a gamut volume can be a measurement used to compare to expected measurements of other paper types. For example, cheaper paper (e.g., untreated and uncoated paper) can be associated with a first paper profile and more expensive paper (e.g., treated and coated paper) can be associated with a second paper profile. Gamut volumes determined from the test sheet can be compared to the first paper profile and the second paper profile to determine if the type of the test sheet can be associated with either profile.

In various embodiments, gamut volume can be calculated from the $L^*a^*b^*$ values in the spectral data, as discussed in further detail below.

In 320, the system can determine whether the determined measurements are similar to expected measurements for a paper type associated with an existing paper profile. If, in 320, the measurements are similar to expected measurements associated with an existing paper profile (e.g., one or more measurements are within a predetermined range and/or threshold of the expected measurements), the process can proceed to 355 and the system can use the existing paper profile for print jobs that use the paper type associated with the test sheet. For example, the system can print documents using the parameters associated with the existing paper profile for any remaining paper that is in the paper feeder, the system can notify an operator of the existing paper profile (e.g., by displaying a name of the paper profile), and/or the system can automatically use the paper profile when paper of the tested type is fed into the system.

If, in 320, the determined measurements are not similar to expected measurements for existing paper profiles (e.g., one or more measurements are not within a predetermined range and/or threshold of the expected measurements), the process can proceed to 325.

In 325, the system can perform print linearization on a second test sheet of the tested type to verify that there are no calibration errors or any other type of error associated with the paper, printheads of the system, etc. If an error is determined, in some embodiments, an adjustment can be made to the calibration parameters, an additional test sheet can be printed, and print linearization can be performed again. If there are no detected errors, the process can proceed to 330.

In 330, the system can adjust parameters (e.g., color management controls). In some embodiments, the parameters can be adjusted based on determined measurements (e.g., determined gamut volumes and/or showthrough of a previous test sheet). For example, if the system determines that there is non-negligible showthrough on a previous test sheet, the total area cover can be reduced (e.g., 220% to 200%) for a subsequent test sheet. In alternative embodiments, the system can adjust parameters to achieve a full range of test results by incrementally reducing or increasing parameter values for each test sheet.

For example, a first test sheet can be printed with a total area coverage of 400%, which can be reduced incrementally from 400% down to 0% with subsequent test sheets or until an acceptable and/or negligible amount of showthrough occurs. As an alternative example, a first test sheet can be printed with a total area coverage of 0%, which can be increased incrementally from 0% up to 400% with subsequent test sheets or until an unacceptable and/or non-negligible amount of showthrough occurs.

In 335, the system can print a subsequent test sheet with color patches based on the adjusted parameters.

In 340, the system can measure the patches using the FWA spectrophotometer, as described in further detail below with regard to FIG. 5, to determine spectral data and determine measurements, such as color, density, and showthrough.

In 345, the system can determine whether one or more measurements are within target ranges. For example, the system can determine whether the gamut volume and/or the showthrough are within target ranges. In some embodiments, the target ranges can be set based on industry standard ranges.

If, in 345, the measurements are not within the target ranges, the process can return to 330, where the parameters are adjusted (330), color patches are printed (335), color patches are measured (340), and it is determined whether the measurements are within target ranges (345). Accordingly, in some embodiments, 330-345 can be repeated until the measurements are within the target ranges.

If, in 345, the measurements are within the target ranges, the process can proceed to 350, and a new paper profile can be generated based on the parameters that resulted in the measured spectral data/measurements within the target ranges. The new paper profile can be stored, for example, in the system.

In 355, the system can use the new paper profile for print jobs that use the paper type associated with the test sheet. For example, the system can print subsequent documents using the parameters associated with the new paper profile, the system can notify an operator of the new paper profile (e.g., by displaying a name of the paper profile), and/or the system can automatically use the new paper profile when paper of the tested type is fed into the system.

While the steps depicted in FIG. 3 have been described as performed in a particular order, the order described is merely exemplary, and various different sequences of steps can be performed, consistent with certain disclosed embodiments. For example, in some embodiments, the system may not perform print linearization in 325. Additional variations of steps can be utilized, consistent with certain disclosed embodiments. Further, the steps described are not intended to be exhaustive or absolute, and various steps can be inserted or removed.

FIG. 4 is an example of a printed test sheet with multiple different colors of color patches, consistent with certain disclosed embodiments.

Printed test sheet 30 can represented a printed test sheet printed by an inkjet printer system (e.g., inkjet printer system 100 in FIG. 1) and/or a printed test sheet printed in 305 or 335 in FIG. 3. As depicted in FIG. 4, printed test sheet 30 can include rows of different color patches 31 and timing or triggering indicia marks 33. As described, and shown in FIG. 1, printed test sheet 30 can be printed and then scanned by an FWA spectrophotometer (e.g., FWA 140 in FIG. 1 or FWA spectrophotometer system 10 in FIG. 2). In various embodiments, printed test sheet 30 can be scanned to determine spectral data, which can be converted into measurements that are used to determine if a new and/or unknown paper type can be associated with an existing paper profile or if a new printer profile needs to be generated, as described above.

Figure 5:
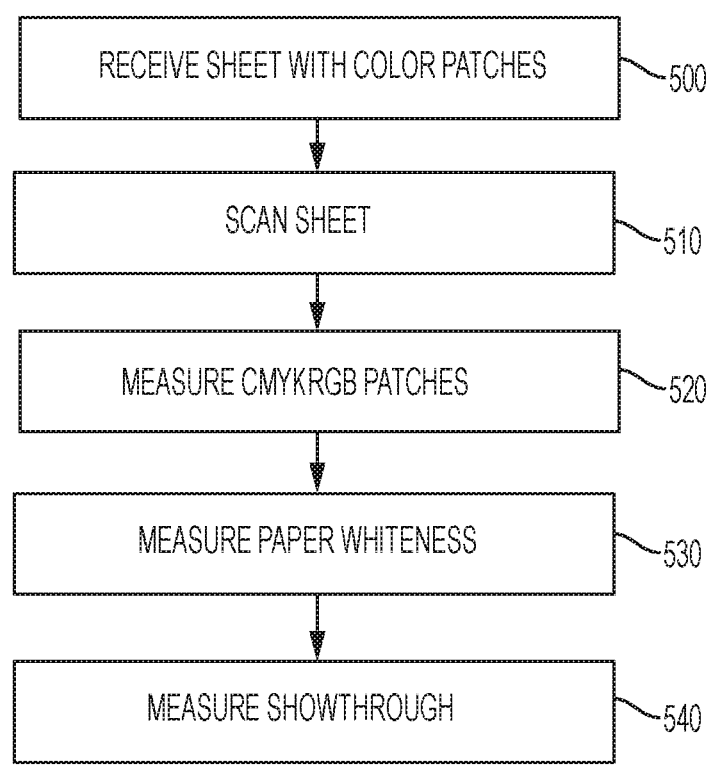
FIG. 5 is a flow diagram illustrating an exemplary method of measuring color patches, consistent with certain disclosed embodiments.

FIG. 5 is a flow diagram illustrating an exemplary method of measuring color patches, consistent with certain disclosed embodiments. In some embodiments, the process described with regard to FIG. 5 can represent a process performed using a processor and an FWA spectrophotometer (e.g., FWA 140 in FIG. 1 or FWA spectrophotometer system 10 in FIG. 2).

The process can begin in 500 when a printed test sheet is received at an FWA. In 510, the FWA can scan the printed test sheet to determine spectral data. In some embodiments, the FWA can include scanners that scan both sides of the paper.

In 520, the spectral data can be used by the processor to determine measurements such as color levels of the patches. For example, the processor can measure color levels based on spectral data associated with CMYK (cyan, magenta, yellow, and black) color patches and RGB (red, green, blue) color patches.

In 530, the spectral data can be used by the processor to determine measurements such as a whiteness level of the printed test sheet.

In 540, the processor can convert the spectral data to color density to determine a showthrough level. For example, spectral data from the reverse side of the printed test sheet (i.e., the opposite side from the printed color patches) can be converted to color density to determine a showthrough level.

While the steps depicted in FIG. 5 have been described as performed in a particular order, the order described is merely an example, and various different sequences of steps can be performed, consistent with certain disclosed embodiments. For example, 520-540 can be performed in any order and/or simultaneously. Additional variations of steps can be utilized, consistent with certain disclosed embodiments. Further, the steps described are not intended to be exhaustive or absolute, and various steps can be inserted or removed.

Figure 6:
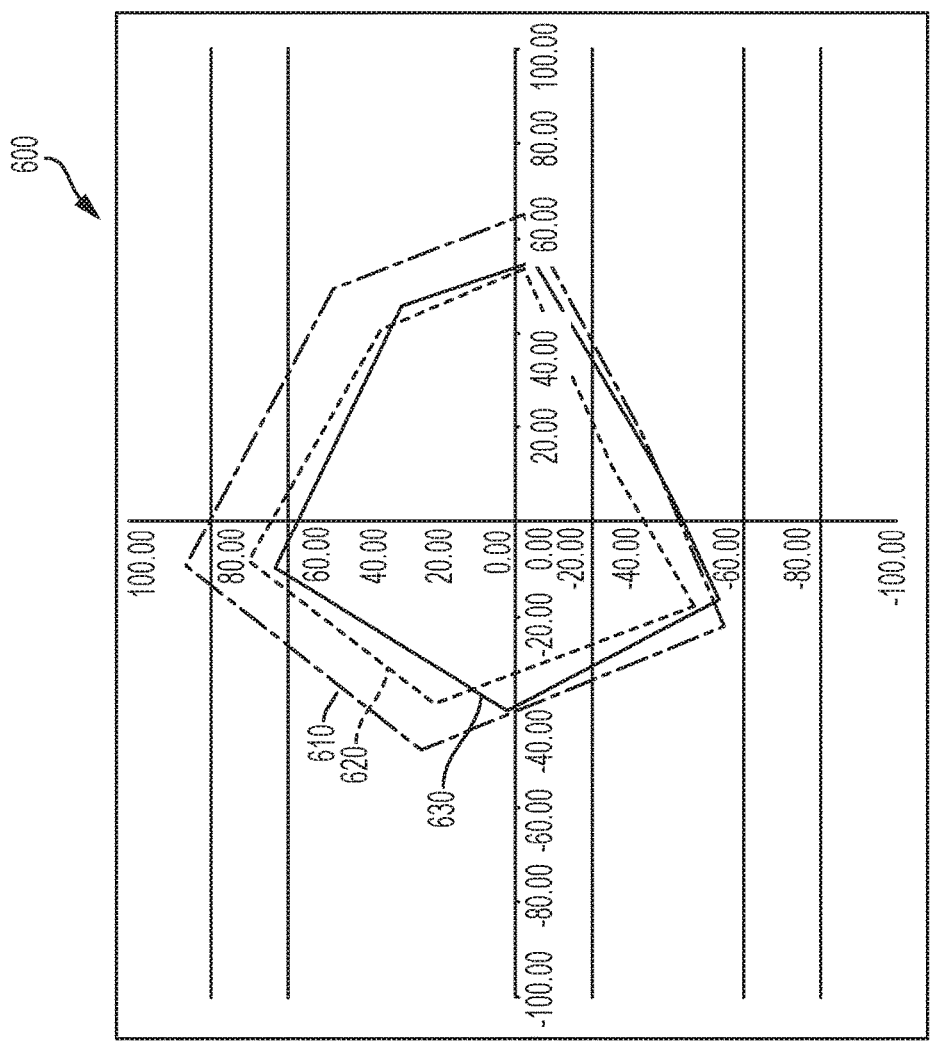
FIG. 6 is a diagram illustrating an example two-dimensional slice of a three-dimensional graph that depicts the color gamut volumes of different paper types, consistent with certain disclosed embodiments.

FIG. 6 is a diagram illustrating an example two-dimensional slice of a three-dimensional graph that depicts the color gamut volumes of different paper types, consistent with certain disclosed embodiments. As shown in FIG. 6, graph 600 can be a two-dimensional slice of a three-dimensional graph of L*a*b*, with L* representing lightness and a* and b* representing color-opponent dimensions. For example, graph 600 can represent a graph of a*b*.

Graph 600 can depict color gamut volumes for three different paper types. In some embodiments, the color gamut volumes can represent known color gamut volumes associated with the three different paper types, and can be used when comparing spectral data measured using an FWA with known color gamut volumes to determine if an existing paper profile can be used for a tested paper sheet type (e.g., 315 and 320 in FIG. 3).

For example, volume 610 can represent a color volume for treated and coated paper, volume 620 can represent a color volume for untreated and uncoated paper, and 630 can represent a color volume for treated and uncoated paper.

As the paper quality and cost increase, so does the size of the achievable gamut. Graph 600 gives a general example of the differences. Using the basic patches of 100% C, M, Y, K, R, G, B, and W (white) a gamut volume can be calculated from the L*a*b* values determined using an FWA (e.g. 510 in FIG. 5). For example, the gamut volumes shown can be 98,683 for volume 620, 139,046 for volume 630, and 217,273 for volume 610. Thus, a tested paper type that results in spectral data converted into volumes similar to the known volumes (e.g., within a range and/or threshold) can use a paper profile associated with the paper type with the similar volume. Checking the L*a*b* of paper whiteness for a printed test sheet can also be used to determine which known paper profiles to use or if a new profile is needed.

While the teachings has been described with reference to the example embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A method comprising:
   printing one or more color patches on a test sheet of paper associated with a paper type;
   determining spectral data of the one or more color patches using a full width array spectrophotometer;
   determining measurements based on the spectral data;
   determining that at least one of the measurements is equal to or within a range of a measurement associated with an existing paper profile;
   printing subsequent sheets of paper associated with the paper type using parameters associated with the existing paper profile;
   printing one or more color patches on a second test sheet of paper associated with a second paper type;
   determining second spectral data of the one or more color patches of the second test sheet using the full width array spectrophotometer; and
   adjusting parameters of a printer based on determining that one or more measurements based on the second spectral data are not equal to or within a range of measurements associated with existing paper profiles.

2. The method of claim 1, further comprising receiving instructions to profile the test sheet of paper.

3. The method of claim 1, wherein printing comprising printing using an inkjet printer.

4. The method of claim 3, wherein the inkjet printer is an aqueous inkjet printer.

5. The method of claim 3, wherein the full width array spectrophotometer is an inline spectrophotometer of the inkjet printer.

6. The method of claim 1, wherein the spectral data further comprise spectral data corresponding to the whiteness of the test sheet of paper.

7. The method of claim 1, wherein the full width array spectrophotometer scans both sides of the test sheet of paper.

8. The method of claim 1, wherein the measurements comprise one or more of color brightness, color gamut volumes, color contrast, ink showthrough, or paper whiteness.

9. The method of claim 1, wherein the parameters comprise one or more of total area coverage, ink limits, gray component replacement, or color contrast.

10. The method of claim 1, further comprising
    performing a second method until one or more new measurements associated with a new test sheet of paper are equal to or within a range of target measurements, the second method comprising:
    adjusting parameters of the printer based on one or more measurements associated with a previous test sheet of paper;
    printing one or more color patches on a new test sheet of paper associated with the second paper type based on the adjusted parameters of the printer;
    determining new spectral data of the one or more color patches of the new test sheet of paper using the full width array spectrophotometer; and
    determining new measurements based on the new spectral data; and
    generating a new paper profile based on the adjusted parameters that resulted in the one or more new measurements within the range of target measurements.

11. The method of claim 10, wherein the parameters are iteratively adjusted.

12. A system comprising:
    a printer;
    a processing system comprising one or more processors capable of transmitting data to the printer; and
    a memory system comprising one or more computer-readable media, wherein the one or more computer-readable media contain instructions that, when executed by the processing system, cause the processing system to perform operations comprising:
    printing one or more color patches on a test sheet of paper associated with a paper type;
    determining spectral data of the one or more color patches using a full width array spectrophotometer;
    determining measurements based on the spectral data;
    determining that at least one of the measurements is equal to or within a range of a measurement associated with an existing paper profile;
    printing subsequent sheets of paper associated with the paper type using parameters associated with the existing paper profile;
    printing one or more color patches on a second test sheet of paper associated with a second paper type;
    determining spectral data of the one or more color patches of the second test sheet using the full width array spectrophotometer; and
    adjusting parameters of a printer based on determining that one or more measurements based on the second spectral data are not equal to or within a range of measurements associated with existing paper profiles.

13. The system of claim 12, wherein the printer is an aqueous inkjet printer.

14. The system of claim 13, wherein the full width array spectrophotometer is an inline spectrophotometer of the aqueous inkjet printer.

15. The system of claim 12, wherein the full width array spectrophotometer scans both sides of the test sheet of paper.

16. The system of claim 12, wherein the measurements comprise one or more of color brightness, color gamut volumes, color contrast, ink showthrough, or paper whiteness.

17. The system of claim 12, wherein the parameters comprise one or more of total area coverage, ink limits, gray component replacement, or color contrast.

18. The system of claim 12, the operations further comprising
- performing a second method until one or more new measurements associated with a new test sheet of paper are equal to or within a range of target measurements, the second method comprising:
  - adjusting parameters of the printer based on one or more measurements associated with a previous test sheet of paper;
  - printing one or more color patches on a new test sheet of paper associated with the second paper type based on the adjusted parameters of the printer;
  - determining new spectral data of the one or more color patches of the new test sheet of paper using the full width array spectrophotometer; and
  - determining new measurements based on the new spectral data; and
- generating a new paper profile based on the adjusted parameters that resulted in the one or more new measurements within the range of target measurements.

* * * * *